Sept. 10, 1935. T. J. HALVORSON ET AL 2,013,778
COMBINATION MATERIAL WORKING MACHINE
Filed Feb. 9, 1934 6 Sheets-Sheet 3
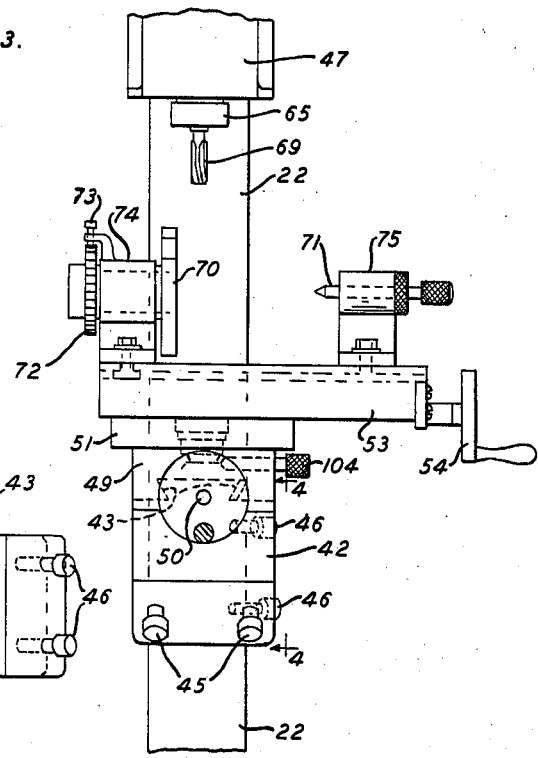
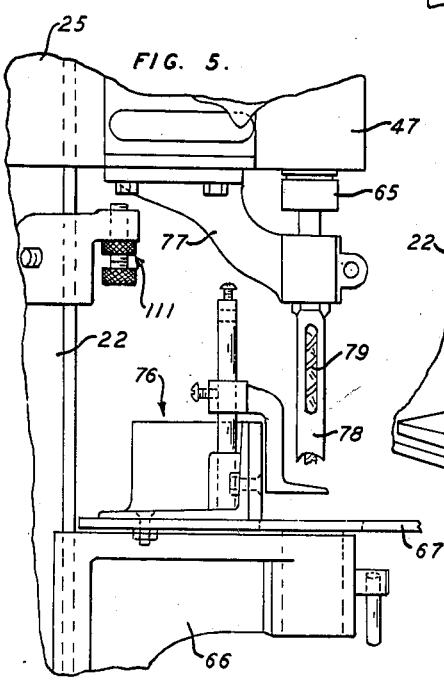
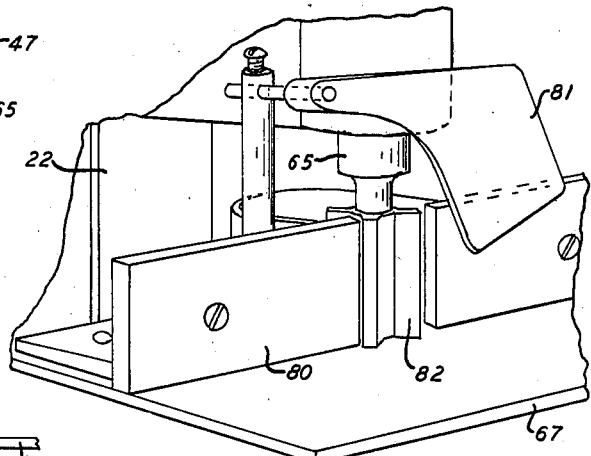
INVENTORS
T. J. HALVORSON
J. A. SHAND
BY
E.R. Nowlan
ATTORNEY

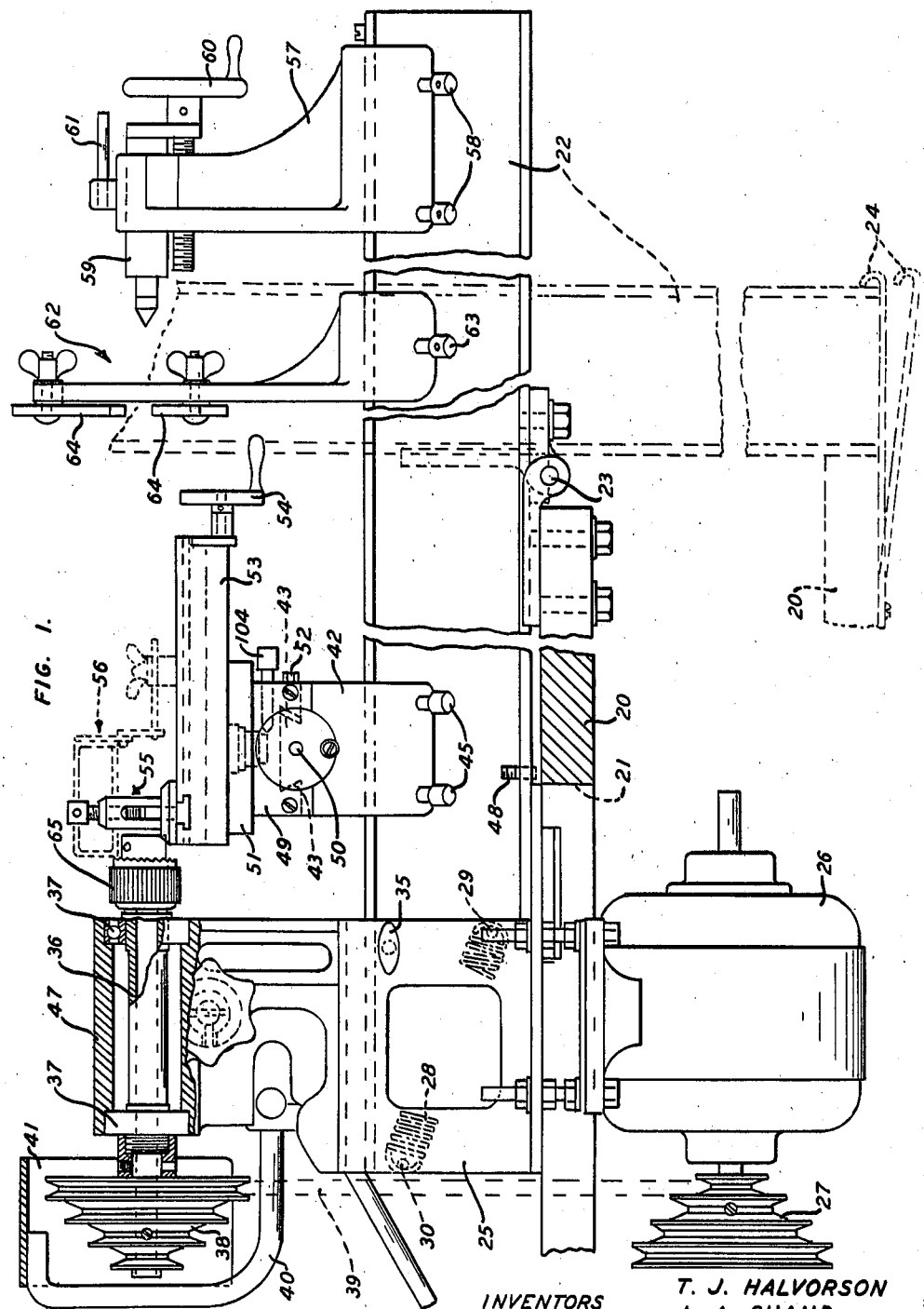

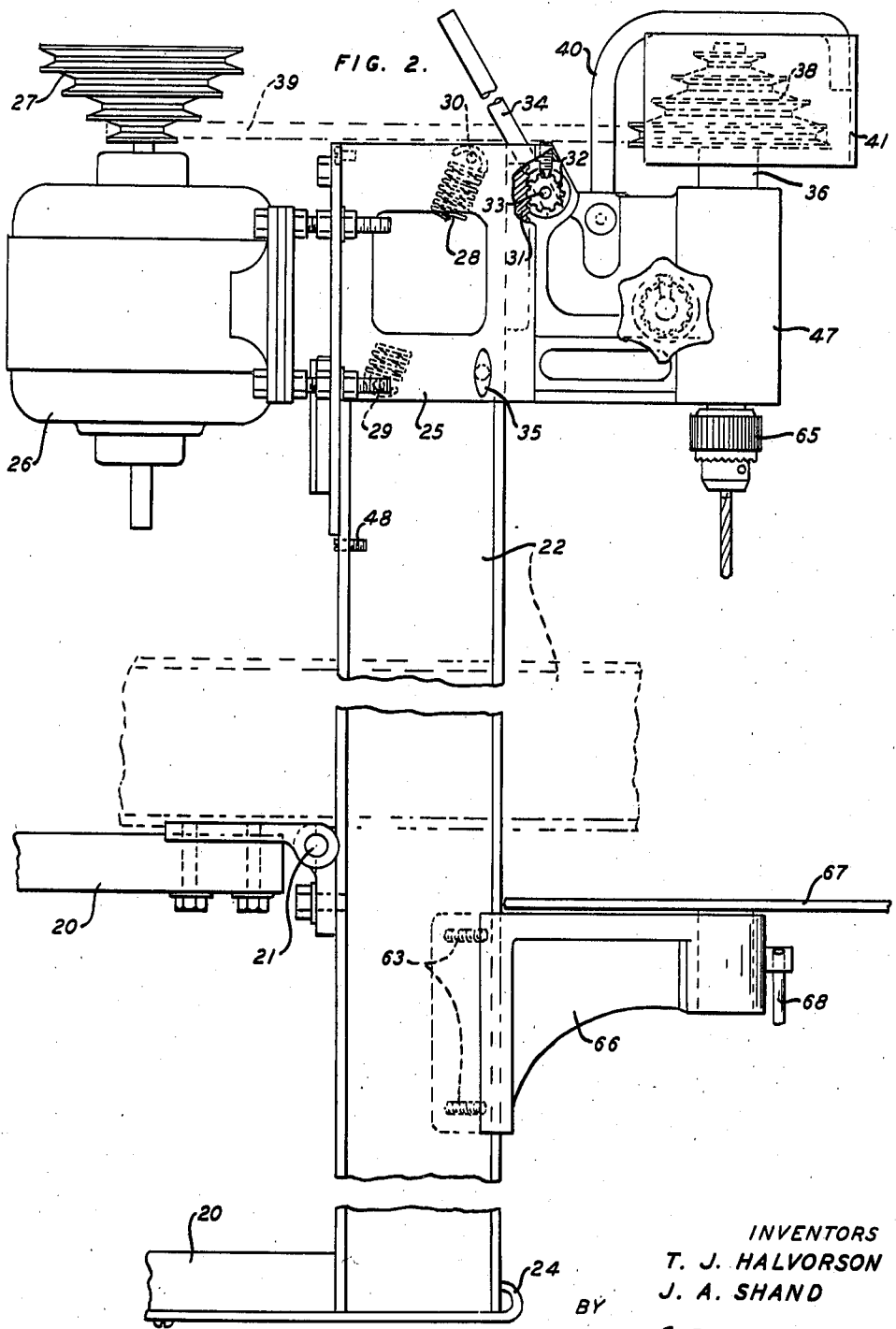

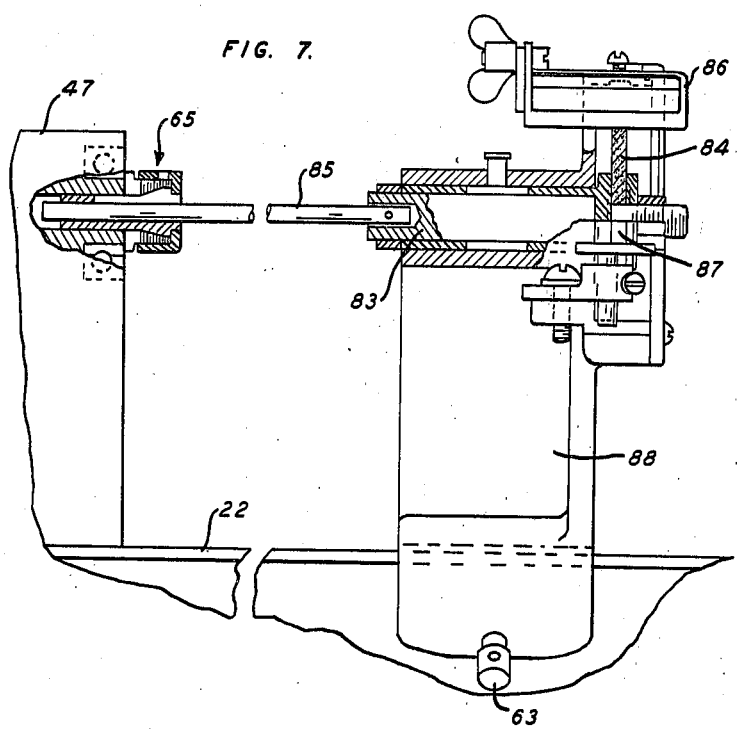
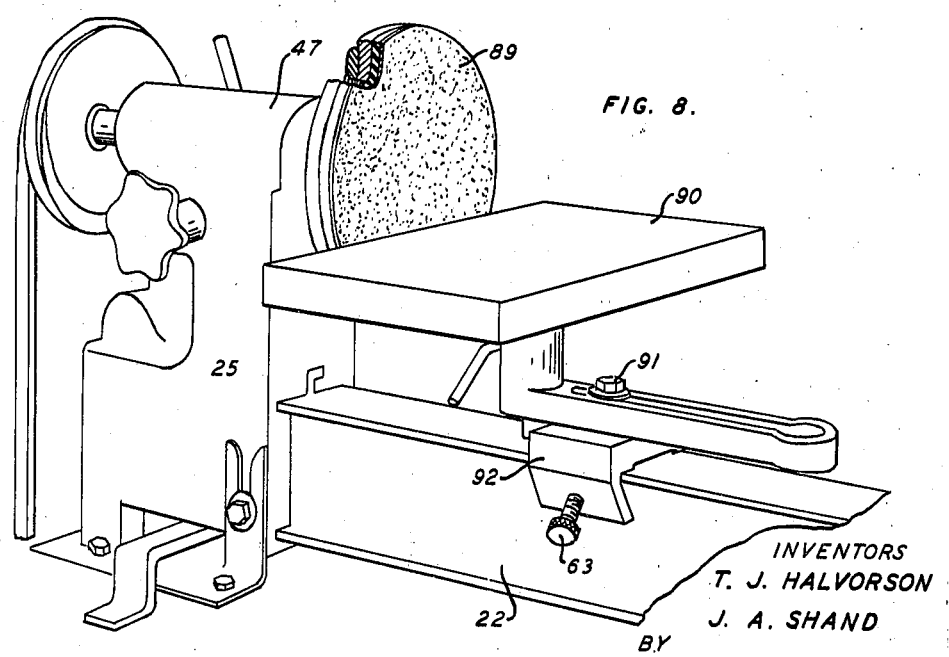

Sept. 10, 1935.　　T. J. HALVORSON ET AL　　2,013,778
COMBINATION MATERIAL WORKING MACHINE
Filed Feb. 9, 1934　　6 Sheets-Sheet 5
FIG. 9.
FIG. 10.
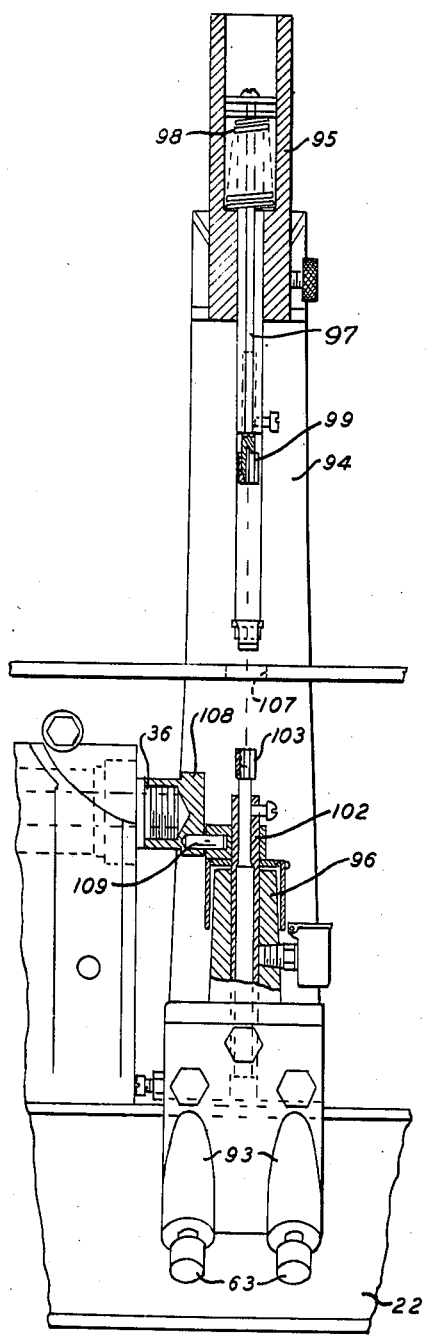
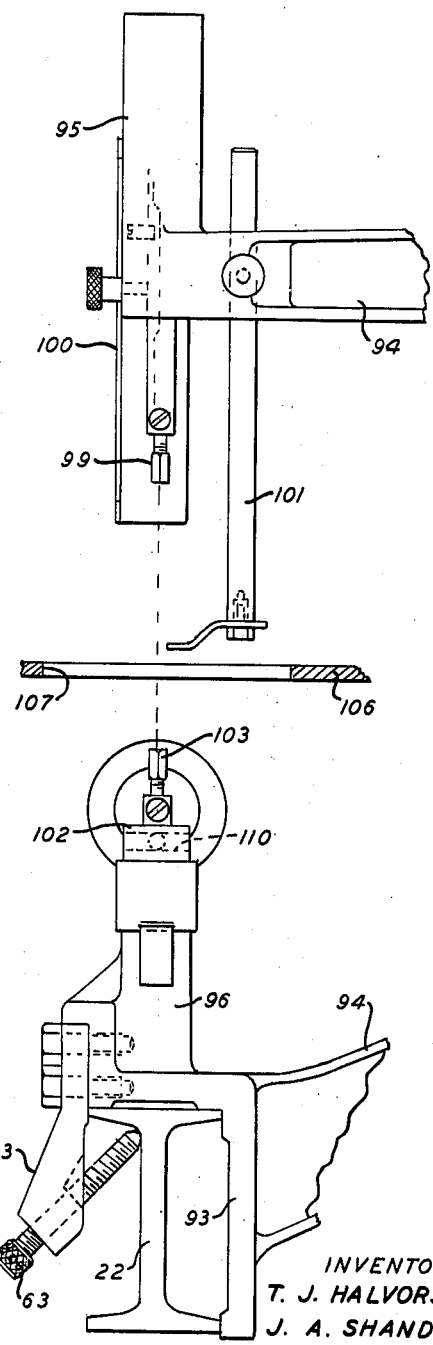
INVENTORS
T. J. HALVORSON
J. A. SHAND
BY
E. R. Nowlan
ATTORNEY INVENTORS
T. J. HALVORSON
J. A. SHAND
BY E.R. Nowlan
ATTORNEY Patented Sept. 10, 1935

2,013,778

UNITED STATES PATENT OFFICE 2,013,778

COMBINATION MATERIAL WORKING MACHINE

Thomas J. Halvorson, Bloomfield, and John A. Shand, West Orange, N. J., assignors to Western Electric Company, Incorporated, New York, N. Y., a corporation of New York Application February 9, 1934, Serial No. 710,442

4 Claims. (Cl. 29—27)

This invention relates to a combination material working machine and more particularly to a combination power driven machine tool for both wood and metal working capable of performing a large variety of operations.

An object of the invention is to provide a power driven machine tool modifiable by simple adjustment and interchange of parts to act as a lathe, drill-press, boring machine, wood shaping machine, milling machine, power saw, jig saw, sander, grinder, mitre cutter, and the like.

With the above and other objects in view, one embodiment of the invention contemplates a machine having a permanent base such as a table or work-bench to which is pivotally attached a tool bed in such wise that the bed may be positioned horizontally as a support for tools and work in one type of operations, and vertically for another type, the bed having a motor mounted thereon to swing therewith. There is also provided a mounting block for tools, rests, vises or the like attachable to the bed in either of two positions relative thereto.

Other objects and characteristic features of the invention will appear from the following detailed description of one embodiment thereof taken in connection with the accompanying drawings in which the same reference numerals are applied to identical parts in the several figures and in which Fig. 1 is a broken view in side elevation of a unitary tool embodying the invention and shown adapted for use as a lathe with its bed horizontally disposed;

Fig. 2 is a similar view thereof disposed for use as a drill press;

Fig. 3 is a broken view thereof in right hand elevation as arranged for milling;

Fig. 4 is a detached view of the mounting block of Fig. 3;

Fig. 5 is a broken view in side elevation of the tool of Figs. 1 and 2 as adapted for mortising;

Fig. 6 is a detached broken view in perspective of the detachable work table and the tool head as arranged as a shaper or planer for wood;

Fig. 7 is a slightly enlarged broken view of the machine in side elevation and partly in longitudinal vertical section adapted for grinding;

Fig. 8 is a broken perspective view thereof arranged for sanding;

Fig. 9 is a broken view thereof in end elevation and partly in transverse section as set up with a jig-saw;

Fig. 10 is a right hand end view of the arrangement of Fig. 9;

Figure 11:
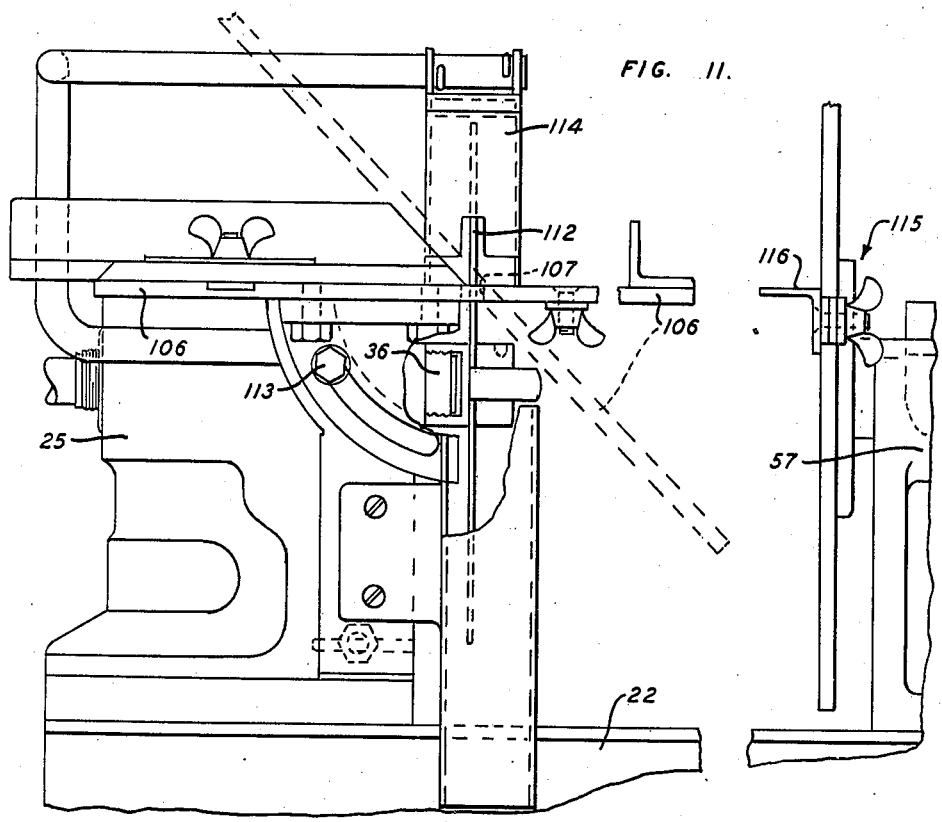
Fig. 11 is a broken view of the machine in side elevation on an enlarged scale as adapted for sawing.

In the embodiment of the invention herein disclosed a bench or table 20 is provided with a flat horizontal top provided with an aperture or trap 21 to receive the motor hereinafter described. A main supporting member 22 is hinged or otherwise pivotally secured to an edge of the bench top as at 23 to be capable of being horizontally disposed as shown in full lines in Fig. 1 and in dotted lines in Fig. 2 for use as a lathe bed or the like, or of being positioned vertically as shown in dotted lines in Fig. 1 and in full lines in Fig. 2 for use as the post of a drill press, milling machine or the like. A bottom member of the bench 20 is provided with a spring catch 24 to releasably secure the post 22 in its vertical position. The bed or post 22 is here shown as an I-beam which is an excellent form having great resistance to both transverse and torsional stresses. The top face and lateral edges of the top flange are substantially flat and parallel to act as supports and guides for other parts and members.

A heavy and rigid block 25 is mounted on the bed or post at its left or upper end embracing it with freedom to slide thereon. A motor 26 preferably electrical having an appropriately stepped pulley 27, is rigidly mounted on the under or rear face of the block. The block is yieldingly held at its left or upper limit of motion by a pair of tension springs 28 attached to pins 29 and 30 mounted respectively in the block and in the bed or post. A toothed rack 31 is rigidly mounted on the bed and coacts with a pinion 32 rigidly on a shaft 33 mounted in the block. A lever handle 34 rigid on the shaft affords means of forcing the block along the member 22 by the coaction of the rack and pinion. A wing headed screw 35 is mounted in the block and can be jammed against the beam 22 to lock the block rigidly thereon when desired.

The upper or forward side of the block carries an integral extension or housing 47 in which is mounted a rotatable substantially cylindrical head 36, by means of anti-friction thrust and radial bearings 37. A stepped pulley 38 is mounted on the left or upper end of the head 36 in inverse relation to the pulley 27 and is driven from the latter by a belt 39. A bracket 40 on the block 25 carries a safety shield 41 around the pulley 38 which drives the head 36. The right or lower end of the head is formed with an external standard thread for mounting thereon any one of a variety of devices as hereinafter described.

A novel support 42 is adjustably mounted on the beam 22. This support (Figs. 1, 3, and 4) is adapted to be mounted in either of two positions whose orientations relative to the beam are mutually perpendicular, so that one particular face of the support which bears an integral longitudinally bored and threaded male dovetail 43, may be disposed at will either with the surface of the dovetail parallel to the working face of the beam 22 and the length of the dovetail at right angles to the beam as in Fig. 1, or with the surface of the dovetail and its length both perpendicular to the working face of the beam as in Fig. 3. To this end the support as most clearly shown in Fig. 4, is formed and provided with two mutually perpendicularly disposed sets of means for attaching the support to the beam. One set of these means, by which the support may be attached to the beam in the position of Fig. 1 comprises the three bearing surfaces 44 (Fig. 4) adapted to rest against and to coact with the substantially accurately plane top face and rear upper face of the beam (Fig. 1), and the binding screws 45 mounted in the support and adapted to be jammed into the angle between the center rib of the beam and the front upper flange thereof. The other set of means comprises analogous bearing surfaces at right angles to the surfaces 44 adapted to coact with jam screws 46 to hold the support on the beam 22 in the position of Fig. 3. The screws 45 are idle in Fig. 3 and the screws 46 are idle in the position of the support shown in Fig. 1 in which they are out of sight at the rear. A removable stud 48 is mounted in the beam to prevent the block 25 from being forced down (Fig. 2) far enough to over-stretch the springs 28. Evidently the pulleys 27 and 28 are preferably made large enough so that the belt 30 will clear the beam and if the stud 48 and springs 28 be removed the block 25 carrying the motor 26 and the driving head 36 may be positioned at will anywhere on the beam between the upper end thereof and the pivot 21, by running the pinion 32 off the rack 31.

By combining one or more of a variety of auxiliary mechanisms with the main elements of the machine as described above, the machine may be adapted in a simple and expeditious manner to perform a large variety of operations on wooden or metallic objects.

As shown in Fig. 1, a double slide rest is mounted on the support 42. This rest is of conventional design, having a base 49 formed underneath with a female dovetail to match the dovetail 43 and provided with a screw fitting into the threaded bore of the block and a wheel 50 to adjust the position of the slide on the support transversely of the beam. The upper surface of the block 49 has a second block 51 pivotally mounted thereon by means of a vertical stud on the under face of the block 51 which enters a corresponding recess in the upper face of the block 49. A jam screw 52 in the block 49 bearing against the dovetail 43 can be used to lock the slide when adjusted transversely of the beam. A similar jam screw 104, mounted in the block 49 and bearing against the stud on the under face of the block 51 can be used to lock the slide when adjusted pivotally relatively to the beam. The upper face of the block 51 is formed with a dovetail generally oriented substantially transversely of the dovetail 43 though not necessarily at right angles thereto, and on this dovetail is mounted a slide 53 controlled thereon in well known fashion by a screw and hand wheel 54 to adjust the slide 53 parallel to the beam. The upper face of the block 53 is ordinarily flat and provided with one or more inverted T grooves of conventional form for the attachment of such auxiliaries as may be desired, e. g. a tool holder of conventional design as illustrated generally at 55, and/or a chip guard as indicated in dotted lines at 56.

Near the right hand end of the beam in Fig. 1 a tail stock is mounted thereon. This comprises a block 57 of conventional form having on its under surface bearing faces (not shown) like the faces 44 on the support 42, and being provided with jam screws 58 adapted to coact with the bearing faces to bind the block on the beam. Obviously the block 57 may be placed on and attached to or removed from the beam without disturbing any other element of the machine, and coarse adjustment of the block on the beam is made manually by loosening the screws 58 and sliding the block on the beam. A non-rotatable, pointed spindle 59 is mounted horizontally in the upper part of the block 57 with freedom to slide therein parallel to the beam. Such sliding is controlled by the handwheel 60 and the spindle may be locked by the lever 61 in a conventional fashion which is obvious from the drawings though not disclosed in complete detail.

The machine set up and equipped as just described and with the block 25 locked in place by the screw 35 is admirably adapted for use as a metal turning lathe, the head 36 being provided on its threaded right hand end with a chuck 65 of any approved design (not shown in detail). The head 36 being hollow is capable of receiving lengthy pieces of rod stock thus making it possible to use the machine as a quasi-screw-machine. In case the stock being turned is long and slender and needs additional support, one or more auxiliary rests 62 of conventional construction except that their bases are formed as in the blocks 42 and 57 with bearing faces like the faces 44 and provided with jam screws 63 to lock the rests on the beam, may be mounted on the beam where required. Such rests will preferably be provided with means such as the adjustable arms 64 between which the rotating stock may be confined.

For wood turning the block 42 and chuck 65 may be removed and a tool rest of conventional form except for bearing surfaces 44 and a jam screw 63 like those of the rest 62 may be substituted for the slide 53 and block 42, and a conically pointed stock and driving dog may be substituted for the chuck 65. These last being so well known and in no way novel are not illustrated.

In Fig. 2, the machine is shown as arranged and equipped for use as a drill press. The beam is now in its vertical position and locked there by the spring catch 24. The screw 35 is loosened permitting the block 25 with the head 36 and its drive to be moved by the lever 34. A block 66 adjustably attached by screws 63 to the beam 22, now a post, bears a work supporting table 67 adjustably clampable in the block by the handle 68. If it be desired to clamp the work in a supporting device, the block 42 with the slide 53 may be substituted for the block 66 and table 67 in the position shown in Fig. 3.

In Fig. 3, the machine with the beam vertical as a post, is shown as adapted for milling, the slide 73 being provided in this instance with a device for holding work and indexing it under the end milling cutter 69 held in the chuck 65. The device comprises a miniature headstock 74 carrying a rotatable chuck 70 and facing a corresponding miniature tailstock 75 carrying an adjustable conical ended spindle 71. The headstock also carries a toothed wheel 72 mounted on the headstock shaft to rotate with the chuck 70 and adjustably held against rotation by the screw 73. Headstock 74 and tailstock 75 are bolted into the inverted T grooves of the slide 53.

Fig. 5 shows the machine as set up for mortising wooden parts with the block 66 and table 67 carrying a conventional work clamping device generally indicated at 76 and not described in detail as its construction and operation are both self-evident and irrelevant. A bracket 77 is bolted to the under face of the block 25 to carry the square chisel 78 of the mortising tool, the auger 79 of which is mounted in the chuck 65. In this figure a micrometer stop 111 of self-evident construction is shown clamped to the beam 22 and coacting with the block 25 to accurately limit the travel thereof.

Fig. 6 shows the machine as used for wood shaping, with a fixed guard 80 and a swinging guard 81 mounted on the table 67 to protect the operator from the shaping tool 82 mounted in the chuck 65, the beam 22 being again a vertical post.

In Fig. 7 the beam 22 is horizontal. A base 88 clamped thereon as before by a screw 63 carries a horizontal shaft 83 journalled therein. A grinding wheel 84 is detachably mounted on the protruding right end of the shaft by conventional means not necessary to be particularized here. A drive shaft 85 is coupled at one end by a pivotal joint to the left end of the shaft 83 and is gripped at the other end in the chuck 65 to drive the wheel 84. A conventional safety screen 86 and work support 87 are conventionally attached to the base.

In Fig. 8 a sanding disc 89 is carried and driven by the chuck 65, while a work table 90 is mounted at 91 for pivotal adjustment on a base block 92 which in turn is attachable to and longitudinally adjustable on the beam 22 by the clamp screw 63.

Figs. 9 and 10 show a jig-saw attachment mounted on the beam 22 by clamp screws 63 in the base 93 to be driven from the head 36. The base 93 carries an arcuate bracket 94 bearing vertically opposite upper and lower saw heads 95 and 96 respectively. A vertically reciprocable plunger 97 is mounted in the upper head and urged upwardly by the spring 98. The lower end of the plunger 97 carries a conventional jig-saw clamp 99. A guard 100 is also mounted on the head 95, as well as a work hold down device 101. The structure and function of these is either conventional or obvious from the drawing. A vertically reciprocable plunger 102 is mounted in the lower head 96 and carries at its upper end a conventional jig-saw clamp 103. The table 106 used in this set-up is the same as that disclosed in Figs. 11 and 12 and is further described below. It suffices to note here that it has an aperture or slot 107 to permit a saw mounted in clamps 99 and 103 to pass through the table. A cap 108 is screwed onto the head 36 and carries an eccentric pin 109 which rotates with the cap and slides in a transverse groove or slot 110 in the jig-saw clamp 102 thus reciprocating the clamp and therewith a saw held therein, in cooperation with the spring 98.

Figure 12:
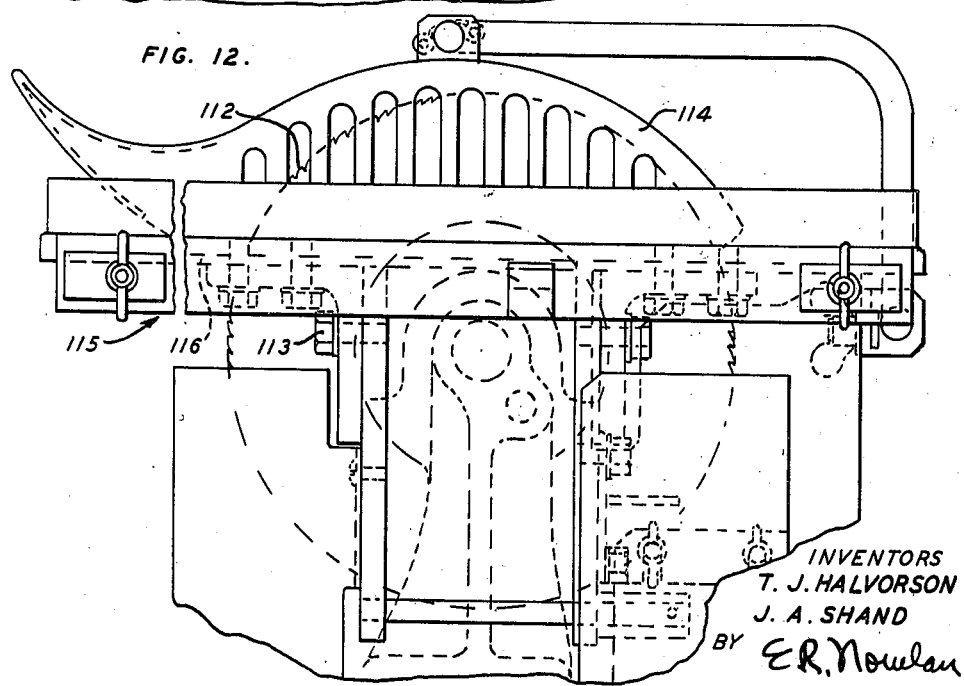
Fig. 12 is an end view from the right of Fig. 11.

In Figs. 11 and 12 a circular saw 112 is mounted directly on and driven by the head 36. A work table 106 has a slot 107 through which the saw passes somewhat above the axis of the saw. The table is pivotally mounted at 113 on the block 25 in conventional fashion, to tilt about the center lines of the slot 107. A conventional guard 114 is mounted over the saw. To aid in supporting large work, a supporting device disclosed at 115 may be mounted in the tailstock block 57, carrying a supporting ledge 116 even with the table 106 but independent thereof and adjustable relative thereto by moving the block 57.

As the machine in some of its possible arrangements comprises detachable and interchangeable mechanisms which are old and well known and whose exact construction and operation are not pertinent to the invention, these have not been described in detail to avoid clouding the invention itself which is embodied in the novel means and features which render the machine capable of simple and swift adaptation to any one of a large variety of uses.

The embodiment herein disclosed is evidently merely illustrative and may be modified and departed from in many ways without departing from the scope and spirit of the invention as pointed out in and limited solely by the appended claims.

What is claimed is:

1. In a material working machine having a fixed base, a supporting member adjustably mounted on the base to be held thereby in either of two working positions, a rotatable head mounted on the member, and a motor mounted on the member and adapted to drive the head, in combination with a support detachably mounted on the member and mountable thereon in either of two positions relative thereto whereby the machine may be adapted to the performance of two different kinds of operation.

2. In a combination lathe and milling machine having a fixed base, a member pivotally attached to the base and adapted to serve in one position as a lathe bed and in another position as a milling machine post, a headstock mounted on the member, and a motor mounted on the member to drive the headstock, in combination with a support detachably secured to the member to be supported thereby in one position relative thereto to hold a tool holder when the machine is used as a lathe and in another position relative to the member to hold a work holding device when the machine is used as a milling machine.

3. In a material working machine, a fixed base, a bed pivotally attached to the base to be supported thereby in either of two positions, a headstock mounted on the bed, and a work-holder mountable on the bed in either of two positions, the bed carrying the headstock and the work-holder as one rigidly aligned unit in the motion of the bed on the base.

4. In a material working machine, a fixed base, a bed pivotally attached to the base to be supported thereby in either of two positions 90° apart, a headstock mounted on the bed, and a work-holder mountable on the bed in either of two positions 90° apart, the bed carrying the headstock and the work-holder as one rigidly aligned unit in the motion of the bed on the base.

THOMAS J. HALVORSON.
JOHN A. SHAND.